AMPLIFIER

Filed Jan. 31, 1963

3 Sheets-Sheet 1

INVENTOR
JOHN F. WALTON

BY Hurvitz & Rose

ATTORNEYS

Dec. 20, 1966 J. F. WALTON 3,293,558

AMPLIFIER

Filed Jan. 31, 1963 3 Sheets-Sheet 2

INVENTOR
JOHN F. WALTON

BY Hurvitz & Rose

ATTORNEYS

INVENTOR
JOHN F. WALTON

BY Hurvitz & Rose

ATTORNEYS

United States Patent Office 3,293,558

Patented Dec. 20, 1966

3,293,558
AMPLIFIER

John F. Walton, McLean, Va., assignor, by mesne assignments, to Halliburton Company, a corporation of Delaware Filed Jan. 31, 1963, Ser. No. 255,406
14 Claims. (Cl. 330—69)

The present invention relates generally to circuits employing a differential amplifier responsive to an input signal and a negative feedback signal from a low impedance output stage. More particularly, the present invention relates to circuit of said character wherein the signal from the low impedance output stage is bootstrapped via a floating power supply back to the differential amplifier to maintain the impedance seen by said input signal at an extremely high level.

The input impedance between the control grid and cathode of vacuum tubes drops considerably if excess current flows between control grid and cathode. It is known that such current flow occurs if (1) the grid is not biased sufficiently negative relative to the cathode; (2) the cathode anode bias is excessive; or (3) the cathode anode current exceeds a predetermined level. To provide an extremely high input impedance device for low current sources, it is necessary that each of the foregoing factors be maintained within specified bounds. Analogous factors also effect the input impedance of common emitter transistorized circuits.

It is also known that signal coupling between weak current sources and low impedance devices may be accomplished with a differential amplifier responsive to an input signal and a negative feedback signal from a low impedance output device. Said circuit arrangement is quite desirable because it is capable of supplying to the load a great deal of current at substantially the same potential as the source without loading same.

The present invention combines these two known aspects of the prior art to provide signal coupling circuits having input impedances commensurate with the actual grid cathode impedance of a tube or the emitter base impedance of a transistor; output impedances as low as 30 ohms; and substantially unity voltage gain. In the case of vacuum tube circuits, this is accomplished by bootstrapping the voltage at the cathode of the output stage to the anodes of the differential amplifier via floating D.C. plate energizing supplies. Since the differential amplifier is of the common cathode type, the cathode to plate voltage and current are maintained relatively constant within the specified bounds for maintaining high input impedances. The control grid may be biased sufficiently negative even for large amplitude input voltages by bootstrapping the cathode voltage at the output stage to the cathodes of the differential amplifier via a negative floating D.C. potential source. The floating potential sources are preferably of the type having very low capacity to ground (approximately 15 pf.) as disclosed in U.S. Patent 2,914,714 so that signal variations are not attenuated thereby.

According to certain embodiments of the invention, the output signal of the differential amplifier is coupled to the control grid of the cathode follower output stage via a series circuit comprising a floating potential source and a resistor. The floating source and resistor are connected in the circuit in such a manner that the resistor negatively biases the control grid of the cathode follower and serves as the load across which the output of the differential amplifier is fed to the control grid of the cathode follower. The same circuit couples the output voltage of the cathode follower to the plate of one tube in the differential amplifier, whereby the anode cathode voltage thereof remains relatively constant.

According to further embodiments of the invention, the output stage includes a cathode follower push pull amplifier having very low output and very high input impedances. The push pull amplifier comprises a pair of tubes wherein the plate output of the first tube is coupled to the grid of the second tube so that the combined impedance of the parallel shunt paths they establish between the cathode of the first tube and ground is substantially constant. By bootstrapping the cathode voltage of the first tube to the plate of the second, the cathode plate bias of the second tube is such that there is always current flow through its anode, a necessary requisite for low output impedance.

The input impedance of the push pull circuit is maintained at a high level to prevent loading of the differential amplifier and the input signal source. Loading does not occur because the screen grid of the cathode follower pentode is bootstrapped to the cathode via a tap on the floating potential source for the second tube. Hence, the quantity and velocity of the electrons passing the control grid are maintained within the prescribed limits for minimum current and admittance between control grid and cathode.

According to yet a further embodiment of the present invention, a very stable difference amplifier having virtually infinite impedance at both of its input terminals is provided. Each input terminal is coupled to a separate differential amplifier, having its output coupled to the control grid of a cathode follower. Two cathode followers are provided, one for each of the differential amplifiers. The cathodes of the cathode followers are connected together and their plate current differences are monitored to derive the output signal. Bootstrapping of the cathode follower voltage to the plates and cathodes of the tubes in the separate differential amplifiers is established through floating D.C. power supplies so that large input impedances at the two input terminals are maintained. To provide extreme stability and enable the voltages at the input terminals to be referenced to any desirable reference, a negative feedback path is established between the cathode follower and each of the differential amplifiers. By utilizing a constant current source for energizing the cathode follower, the common mode rejection for A.C. and D.C. signals is extremely great, i.e. current flow through each cathode follower is totally dependent on the signal coupled to it and does not vary directly in response to the signal supplied to the other cathode follower.

While the previous discussion was primarily with respect to vacuum tubes, it is to be understood that an analogy between transistor and tubes circuits exists, as will be seen by the detailed description infra.

It is accordingly an object of the present invention to provide a new and improved signal coupling device.

A further object of the present invention is to provide a new and improved device having very stable operating characteristics, which device functions to couple a source of weak current to a low impedance load with little change in voltage level and virtually no loading of the source.

Another object of the present invention is to provide a new and improved signal coupling circuit having very high input impedance, very low output impedance, and substantially unity gain.

An additional object of the present invention is to provide new and improved signal coupling circuits suitable for utilization as idealized low impedance drivers, constant voltage and current generators, and voltage and power amplifiers.

A further object of the present invention is to provide a circuit for coupling high impedance sources capable of wide amplitude variations to a low impedance load without loading of the source.

Yet an additional object of the present invention is to provide a new and improved differential amplifier that is very stable, and is responsive to voltages referenced to any convenient potential.

The above and still further objects, features and advantages of the present invention will become apparent upon consideration of the following detailed description of several specific embodiments thereof, especially when taken in conjunction with the accompanying drawings, wherein.

Figures 1, 2, 3, 4:
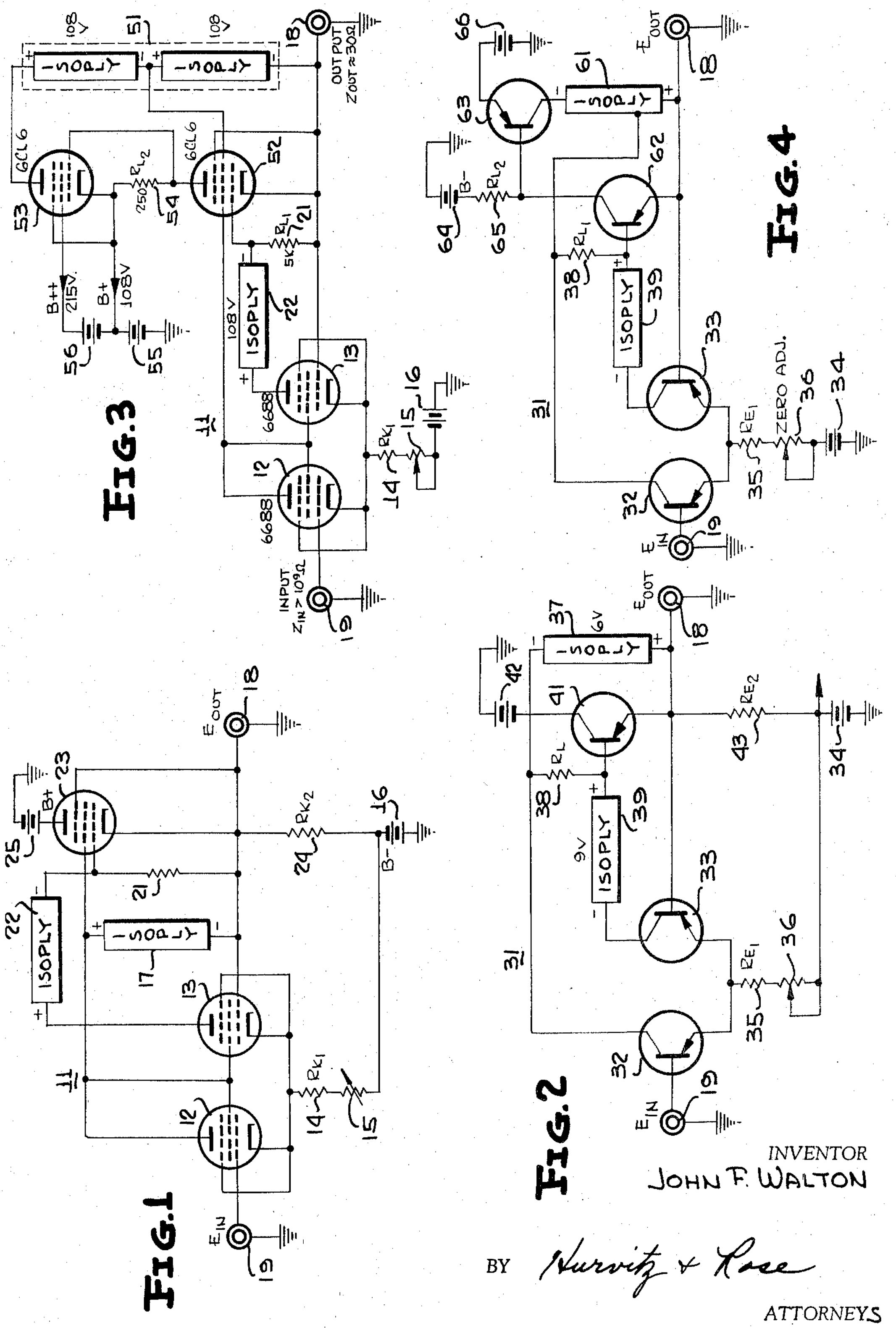
FIGURE 1 is a circuit diagram of a preferred embodiment of the present invention.
FIGURE 2 is a modification of the embodiment of FIGURE 1 wherein transistors are employed rather than vacuum tubes.
FIGURE 3 is a modification of the basic circuit of FIGURE 2 wherein a push pull cathode follower is employed as the output stage.
FIGURE 4 is a modification of the circuit of FIGURE 3 wherein transistors rather than vacuum tubes are employed.

Reference is now made to FIGURE 1 of the drawings wherein common cathode differential amplifier 11, comprising pentodes 12 and 13 is illustrated. The cathodes of tubes 12 and 13 are connected together through a common load resistance, resistor 14 and rheostat 15, to the negative terminal of grounded supply 16. Plate energization for pentode 12 and screen grid energization for both of the tubes in differential amplifier 11 are established through floating isolated supply 17, preferably of the type shown in said Reaves et al. patent, having its negative and positive terminals connected to output terminal 18 of the circuit, and to the energized electrodes, respectively.

The input signals to differential amplifier 11 are supplied from input and output terminals 19 and 18 to the control grids of tubes 12 and 13, respectively. In response to the difference in potential between terminals 18 and 19, the voltage at the cathodes of tubes 12 and 13 is varied to control the plate to anode current of tube 13. The variation in plate to anode current through tube 13 is reflected as a change in voltage across load resistance 21, connected to the anode of tube 13 via isolated supply 22. The latter supply biases the anode of tube 13 relative to its cathode and bootstraps the voltage at output terminal 18 to said anode. Thereby, the plate to cathode voltage and current of tube 13 remain substantially constant within the range where its control grid to cathode impedance is maximum despite fairly substantial variations in input signal potential.

The voltage across resistance 21, indicative of the difference in potential between terminals 18 and 19, is coupled between the control grid and cathode of output cathode follower 23. The cathode and suppressor grid of pentode 23 are connected directly to output terminal 18, the cathode also being connected to the negative terminal of grounded B— supply 16 via its load resistance 24. The plate and screen grid of pentode 23 are energized by grounded B+ supply 25 and floating, isolated supply 17, respectively, the latter supply bootstrapping the output voltage to the screen to maintain the input impedance at a high level. To properly bias the control grid of pentode 23, it is necessary that the anode of tube 13 be energized by source 22 rather than floating supply 17. If the plate load for tube 13 were connected between the positive terminal of the supply 17 and the anode of tube 13, the control grid of pentode 23 would be biased positively relative to its cathode and the tube could not properly function. By interconnecting the control grid of tube 23 with the anode of tube 13 in the manner described, it is automatically maintained at a negative bias because of the positive current flow through resistance 21 from terminal 18.

In operation, a signal variation at input terminal 19 is reflected as a like variation at the cathodes of tubes 12 and 13 and at the anode of tube 13. The change in voltage at the anode of tube 13 is coupled to the control grid of tube 23 and causes a similar change at its cathode, output terminal 18. The resulting variation at the output terminal is of approximately the same amplitude as the voltage at terminal 19 because the network has essentially a unity gain closed loop amplification factor. This variation is coupled back to the control grid of tube 13 to form a negative feedback network having almost 100% degeneration. It is also coupled to the screen grids of tubes 12 and 13 and the anode of tube 12 via the bootstrapped path.

Thereby, the potentials between the electrodes of the tubes in differential amplifier 11 remain relatively constant at a level where significant current flow cannot occur between their grids and cathodes. Hence, the impedance between terminal 19 and ground is maintained at a very high level. Also, the signal fed back to the control grid of tube 13 in the differential amplifier has a tendency to maintain the current through and voltage across cathode resistances 14 and 15 relatively constant. This is advantageous because the grid cathode voltage of the input stage remains approximately the same for most signal variations, at a value where the impedance between the two input electrodes remains at a high level. Deleterious results occur if the control grid varies with respect to the cathodes so that it becomes more positive than —2 volts because current is drawn between grid and cathode to reduce the input impedance of the device.

The output impedance seen between terminal 18 and ground is maintained at a relatively low value because of the inherent characteristics of cathode follower 23. The voltage at terminal 18 is essentially a replica of that applied to terminal 19 in both wave shape and amplitude for fiequencies up to several megacycles. Above these frequencies, the wave shape deteriorates because the capacitance to ground of supplies 17 and 22 becomes a significant factor and introduces phase shift and attenuation into the signal. The voltage at terminal 18 is almost equal in amplitude to that at terminal 19 because the attenuation introduced by the two cathode follower stages is almost compensated for by the amplification factor introduced by the plate load of tube 13. The output voltage may be adjusted to have a zero quiescent value by properly positioning rheostat 15.

Reference is now made to FIGURE 2 of the drawings wherein differential amplifier 31 comprises PNP transistors 32 and 33 having their bases responsive to the signals at input and output terminals 19 and 18, respectively. The emitters of transistors 32 and 33 are coupled together to the positive terminal of grounded D.C. potential source 34 via resistor 35 and rheostat 36. Negative bias for the collector of input transistor 32 is established by way of isolated, floating supply 37, having its positive terminal connected to output connection 18. The negative terminal is connected to resistance 38, the collector load of transistor 33. Because of the voltage drop across resistance 38 in response to signal and bias currents, it is necessary to apply additional negative bias to the collector of transistor 33 by way of isolated supply 39.

Proper biasing and signal coupling to the base of emitter follower transistor 41 are established by the connection of the base to the junction of resistor 38 and supply 39. The collector and emitter of transistor 41 are connected to the negative and positive terminals of grounded bias supplies 42 and 34, respectively, the latter connection being via emitter load resistance 43.

In transistors, the potential between the base and emitter as well as between the base and collector determines the input impedance between the base and emitter electrodes. If the base of the transistor is biased excessively forward relative to its emitter, the amount of base emitter current becomes substantial and the impedance between these two electrodes is reduced to a value which is not tolerable for a high input impedance device. Also, if the collector of a transistor becomes too far back biased relative to the emitter excessive current flows between these two electrodes and causes a significant amount of base current. Hence, it is imperative that the emitter base and emitter collector voltages be maintained in a predetermined region if large input impedances between base and emitter are desired. In the present circuit these criteria are maintained because; the voltage at output terminal 18 is coupled to the collectors of both transistors in differential amplifier 31; and the emitters of transistors 32 and 33 are maintained at substantially constant potential due to feedback from terminal 18 to their emitters via the base of transistor 33.

In operation, input variations at terminal 19 are reflected as like variations at the emitters of transistors 32 and 33 and at the collector of transistor 33. These variations cause the base and emitter of transistor 41 to be driven in a like manner. Thereby, the voltage at the emitter of transistor 41 is of the same polarity as that at terminal 19 and the currents through the transistors of differential amplifier 31 are maintained relatively constant.

It is seen that the operation of FIGURE 2 is substantially like that of the circuit of FIGURE 1 and the circuit of FIGURE 2 is the direct analog of that of FIGURE 1. The exception is in the connection of the driving resistance connected to the control electrode of the output stage. In the transistorized version, this resistance, resistor 38, is connected to biasing supply 37 to insure that the latter does not excessively forward bias the base of transistor 41 relative to its emitter.

Reference is now made to FIGURE 3 of the drawings wherein a modified version of the circuit of FIGURE 1, featuring extremely low output impedance, and gains almost approaching unity, better than 0.99 for light loads, is illustrated. In the circuit of FIGURE 3, the connections for differential amplifier 11 are exactly like those of the differential amplifier 11. It is to be noted from FIGURE 3 that the screen grid bias for tubes 12 and 13 and anode supply for tube 12 are established through the tap of supply 51 in exactly the same manner as similar biases are effected by supply 17, FIGURE 1.

The output stage of FIGURE 3 differs quite radically from that of FIGURE 1 since pentodes 52 and 53 are connected in a push pull cathode follower manner. The anode of tube 52 is connected to the cathode of tube 53 by way of its plate load resistor, across which is developed an input signal for the control grid of tube 53. The plate of pentode 52 is energized by the positive terminal of grounded D.C. potential source 55. The screen grid for tube 52 is energized by the tap on floating supply 51 in exactly the same manner as the screen grid of tube 23 is energized while the anode of tube 53 is energized by the most positive terminal of supply 51. The screen grid of tube 53 is maintained at a relatively large positive voltage, approximately equal to the voltage of source 51 by means of the positive terminal of grounded D.C. potential source 56.

In operation, signal variations at the anode of tube 13 are reflected as like and unlike polarity signals at the cathode and anode of tube 52, respectively. The variations at the anode of tube 52 are coupled to the control grid of pentode 53 so that the net effect of the signal coupled to the control grid of tube 52 is to cause the two tubes connected in the output section to vary in an opposite manner. Thereby, the parallel impedance from terminal 18 to ground via supply 55 and tubes 52 and 53 remains substantially constant despite wide variations in the input signal. Tubes 52 and 53, being connected in parallel with terminal 18 and ground, considerably reduce the output impedance of the stage because of their combined amplification effect on the output signal. The output stage offers relatively high input impedance to the signal developed across resistor 21 because the plate and screen grid of tubes 53 and 52, respectively, are bootstrapped to the cathode voltage. Hence, the potential differences between these electrodes and their respective cathodes are maintained at a substantially constant level where insignificant grid cathode current flows in tube 52.

Reference is now made to FIGURE 4 of the drawings wherein the circuit of FIGURE 3 is illustrated in its transistorized embodiment. The circuit of FIGURE 4 is similar to that of FIGURE 2 with respect to the circuitry of differential amplifier 31. The only exception is that the collectors of transistors 32 and 33 are biased by a tap on negative D.C. source 61.

The output stage, however, differs from that of FIGURE 2 in that a pair of PNP transistors 62 and 63, connected in a push-pull configuration, are employed. The emitter of transistor 62 is directly connected to output terminal 18 and the collector thereof is biased by D.C. supply 64 through load resistance 65. The voltage across resistor 65, an amplified and inverted replica of the voltage applied to the base of transistor 62, is coupled to the base of transistor 63 to control its conductivity. Bias for transistor 63 is established by the connections of its collector and base to the negative terminal of floating supply 61 and the positive terminal of grounded D.C. supply 66, respectively.

In operation, transistors 62 and 63 are driven oppositely because the collector output of transistor 62 is inverted with respect to the voltage at its base. Hence, the current drawn by the two parallel paths between terminal 18 and ground through transistors 62 and 63 remains substantially constant so that the impedance between terminal 18 and ground does not undergo wide variations despite large signal variations. The output impedance between terminal 18 and ground is maintained at a relatively low value because of the inherent characteristics of emitter follower transistor 62, the amplifying action of transistor 63 and the path established between terminal 18 and ground through the latter transistor via supply 66.

Figure 5:
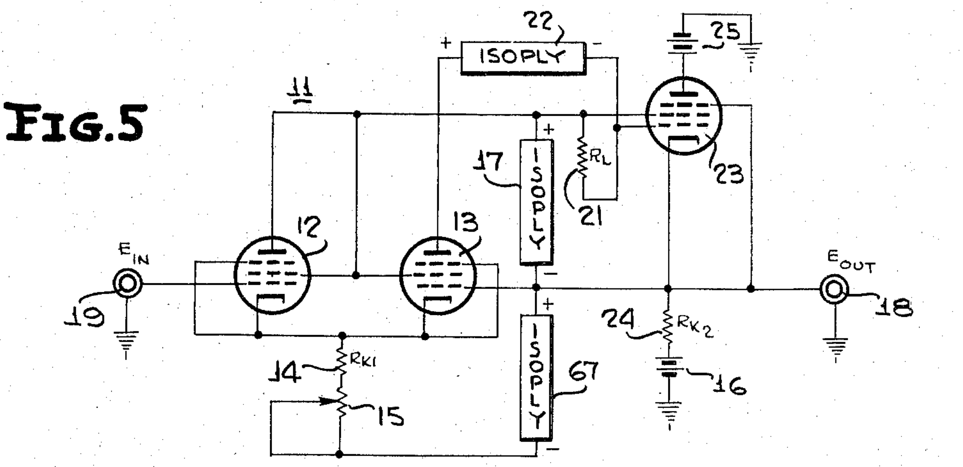
FIGURE 5 is a circuit diagram of a modification of the basic circuit of FIGURE 1 wherein bootstrapping to the cathode as well as the enode of the input differential amplifier stage is provided.

Reference is now made to FIGURE 5 of the drawings wherein the output voltage at terminal 18 is coupled back to the cathode of tubes 12 and 13 in the differential amplifier 11 by way of the negative terminal of floating, isolated supply 67. Hence the cathodes of the tubes in differential amplifier 11 are not referenced to ground as in the circuit of FIGURE 1 but float. Also, resistor 21, the plate load for tube 13, is connected between the control and screen grids of tube 23. This enables resistor 21 to have a very large value, thereby establishing a high gain for tube 13 and an overall system gain very close to one.

The control grid of tube 23 remains negatively biased with respect to cathode thereof despite the connection of resistor 21 between the control and screen grids because the voltage drop across resistance 21 is greater than the voltage of isolated floating supply 17. This is evident when it is realized that resistance 21 is responsive to the combined currents of supplies 17, 22 and 67 through the series circuit formed by these supplies, the anode-cathode path of tube 13, and resistors 14 and 15.

Floating the cathodes of tubes 12 and 13 permits the circuit to be utilized with input voltages of extremely large amplitude without adversely affecting the input impedance seen between terminal 19 and ground. This is because both the anodes and cathodes of the tubes in differential amplifier 11 vary together in a like manner in response to the voltage at terminal 18. Hence, the anode-cathode voltages as well as the cathode control grid voltages of the tubes in differential amplifier 11 remain virtually constant at a level where minimum current through the control grid of tube 12 occurs.

Figure 6:
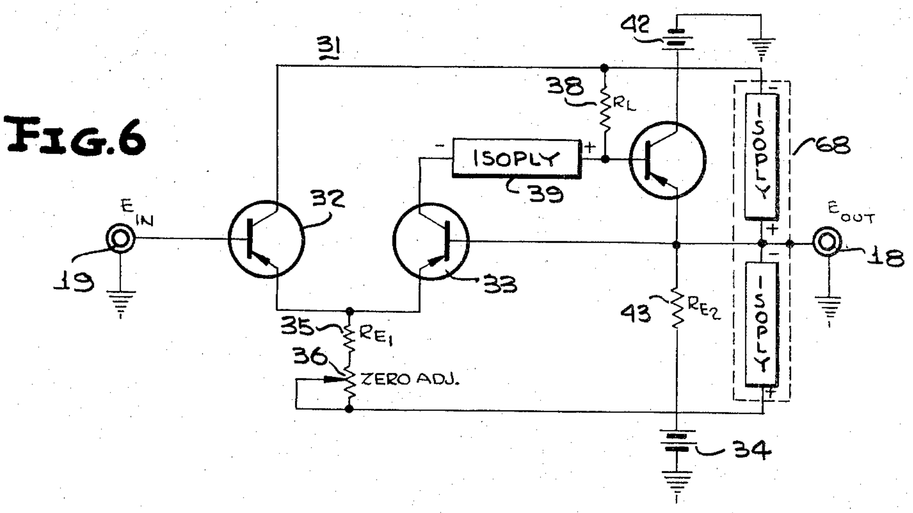
FIGURE 6 is a modification of the circuit of FIGURE 5 wherein transistors are employed.

Reference is now made to FIGURE 6 of the drawing wherein a transistorized analog of the vacuum tube circuit of FIGURE 5 is disclosed. The circuit of FIGURE 6 is substantially like the one of FIGURE 2 except supply 37 is replaced by tapped floating supply 68. Supply 68, having its tap connected to output terminal 18, is arranged so that its positive and negative terminals energize the emitter collector path of the transistors in differential amplifier 31. Thereby, the emitters of transistors 32 and 33 float with the signal at output terminal 18 and are not connected to a source of reference potential as in the circuit of FIGURE 2. The floating arrangement enables resistor 38 to be of larger value than the similar resistor in FIGURE 2 so that higher gains are achieved through the action of transistor 33. In addition, the potential between the emitter and collector of transisor remains substantially constant and base current is reduced to a minimum at input terminal 19. As a result, the input impedance between terminal 19 and ground is at an extremely high value for transistorized circuitry.

Figure 7:
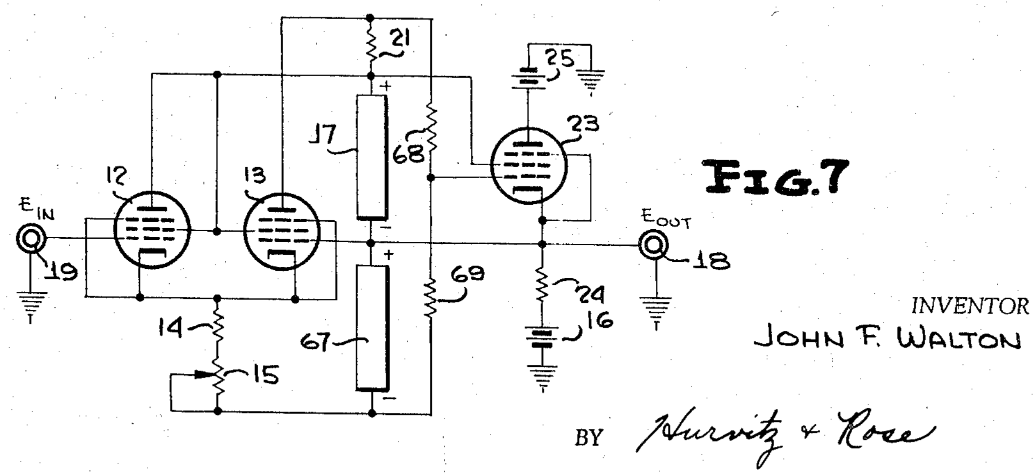
FIGURE 7 is another modification of the circuit of FIGURE 5 wherein one of the isolated supplies is excluded with sacrifices of lower gain.

Reference is now made to FIGURE 7 of the drawings wherein the circuit of FIGURE 5 is modified to have a single tapped floating power supply. The single tapped supply, including positive and negative segments 17 and 67, is connected in exactly the same manner as the correspondingly numbered supply segments of FIGURE 5. The need for supply 22 is eliminated, however, by connecting voltage dividing resistors 68 and 69 between the anode and cathode of tube 13. The plate of tube 13 is biased by coupling current thereto from sources 17 and 67 via load resistor 21.

Exclusion of supply 22 for the plate of pentode 13 requires the insertion of resistors 68 and 69 to bias the control grid of tube 23 negatively with respect to the cathode. Resistors 68 and 69, connected in parallel with anode cathode path of tube 13, load the anode to reduce the amplification of tube 13. Hence, the voltage gain at output terminal 18 is reduced over that of the circuit of FIGURE 5, for many purposes not a serious shortcoming.

The network of FIGURE 7 is characterized by very high input impedance because the output voltage is bootstrapped to the anode and cathode of input stage 12. Bootstrapping is sufficiently great to maintain the voltages between the cathode and anode of tube 12 substantially constant and the cathode of tube 12 sufficiently positive relative to its grid despite wide variations in the input signal at terminal 19 to preclude grid cathode current.

Figures 8, 9, 10:
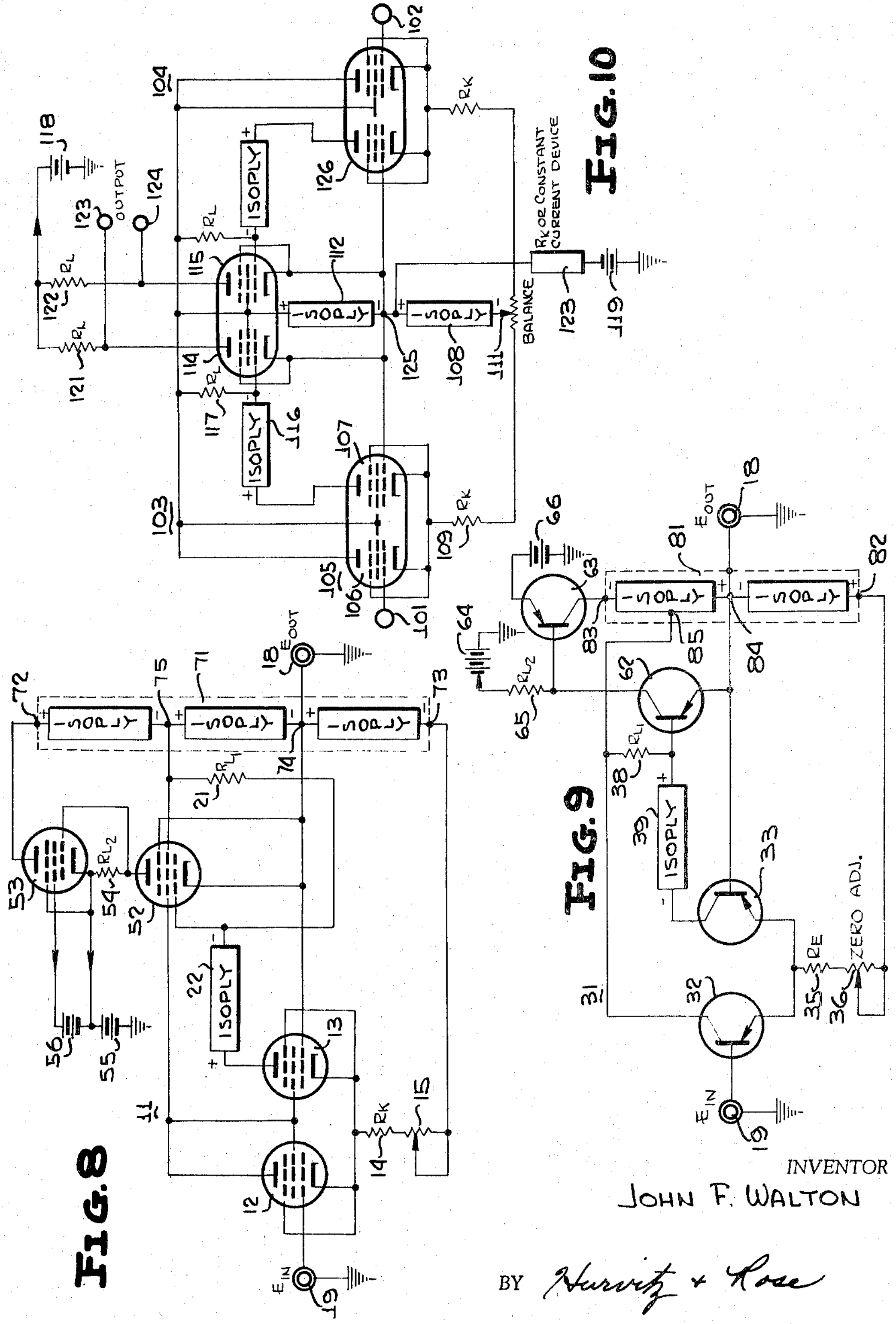
FIGURE 8 is a modification of the circuit of FIGURE 5 wherein both the anode and cathode of the input differential amplifier stage are bootstrapped.
FIGURE 9 is a circuit diagram illustrating a modification of FIGURE 8 wherein transistors arther than vacuum tubes are employed.
FIGURE 10 is a circuit diagram of a differential amplifier according to the present invention.

Reference is now made to FIGURE 8 of the drawings wherein the fully bootstrapped feature of FIGURE 5 is combined with the push pull cathode follower construction of FIGURE 3. In this embodiment the input stage, differential amplifier 11, is energized in exactly the same manner as in the embodiment of FIGURE 5 and the output cathode follower stage comprising pentodes 52 and 53 is energized in the same manner as in the embodiment of FIGURE 3. The connections between the two stages are through load resistor 21 which is connected between the control and screen grids of pentode 52 in a similar manner to the connection of load resistance 21 in FIGURE 5.

To establish the requisite cathode, screen grid, and anode biasing potentials, a single supply 71 having two taps is employed. The positive and negative terminals 72 and 73 of supply 71 are connected to cathodes of the two tubes of the differential amplifier 11 and to the anode of tube 53, respectively. The first intermediate tap 74 is connected to output terminal 18, the cathode of tube 52, and control grid of tube 13. The second intermediate tap 75, at a more positive voltage than tap 74, energizes the screen grids of tubes 12, 13 and 52 as well as the anode of tube 12. In this manner, a single tapped supply energizes each of the electrodes in the circuit except the anode of tube 13 which requires the presence of supply 22. The circuit of FIGURE 8 is characterized by a virtually infinite input impedance, $10^{10}$ ohms, very low output impedance, 30 ohms, and substantially unity gain between terminals 19 and 18.

Reference is now made to FIGURE 9 of the drawings wherein the push pull emitter follower features of FIGURE 4 and the fully bootstrapped features of FIGURE 6 are incorporated into a single transistorized circuit. Hence, the input sections of FIGURES 6 and 9 are identical as are the output sections of FIGURES 9 and 4. To provide proper bias energization for the various transistors of the circuit, a single tapped supply 81 is employed. The positive and negative terminals 82 and 83 of supply 81 are connected to the emitters of transistors 32 and 33 and to the collector of transistor 63, respectively. The center tap of supply 81, having a potential equal to one-half the voltage difference between the terminals 82 and 83, is connected to output terminal 18 while intermediate tap 85 between taps 83 and 84 is connected to energize the collectors of transistors 32 and 33. FIGURE 9 provides a circuit having very high input impedance, very low output impedance, and substantially unity gain, yet requires only two relatively inexpensive isolated supplies.

Reference is now made to FIGURE 10 of the drawings wherein a differential amplifier for deriving an output signal indicative of the voltage difference between terminals 101 and 102 is provided. The circuit of FIGURE 10 comprises two identical sections 103 and 104, each being similar to the double bootstrapping circuit of FIGURE 5. Each of the sections 103 and 104 is responsive to the voltages at its respective input terminal 101 or 102 and at the cathode of the output stage.

Since each of the sections 103 and 104 is identical a description of section 103 alone is believed to suffice. Section 103 comprises a differential amplifier 105 including pentodes 106 and 107. The cathodes of tubes 106 and 107 are connected together and at the negative terminal of floating supply 108 through cathode load resistance 109 and zero balancing potentiometer 111. Energization for the screen grids of tubes 106 and 107 and the anode of tube 105 is supplied by D.C. floating power source 112, the negative terminal of which is connected to a tap common to the positive terminal of source 108. The positive terminal of supply 112 is connected to the control grids of tubes 114 and 115 in the output section of the differential amplifier. The plate of tube 107 is energized through the series combination of supplies 112 and 116 having load resistance 117 connected between them. By energizing the cathode, plate, and screen grid electrodes of the tubes in differential amplifier 105 through the floating supplies, the potential differences between the cathode and grid and cathode and plate of input tube 106 remain in a predetermined region where the impedance between the grid and cathode of tube 106 is substantially infinite, $10^{10}$ ohms.

To provide appropriate plate cathode bias for tubes 114 and 115 in the output section, supplies 118 and 119 are provided. The positive terminal of grounded supply 118 is connected to the anodes of tubes 114 and 115 via plate load resistors 121 and 122, respectively. The cathodes of these two tubes are tied together to the negative terminal of grounded supply 119 via a fairly large resistance 123 which functions to supply a substantially constant current to the cathodes of the two tubes in the output stage. If desired or warranted for the specific use of the circuit, a constant current device may be substituted for source 119 and resistor 123 to provide extremely large A.C. and D.C. common mode rejection between the two signals of tubes 114 and 115. A non-grounded output voltage indicative of the floating potentials between terminals 101 and 102 is derived by monitoring the potential difference across resistors 121 and 122 at output terminals 123 and 124.

In operation, a certain quiescent voltage indicative of the sum of the voltages at the control grids of tubes 114 and 115 is maintained at tap 125 between floating supplies 108 and 112 when the potentials at terminals 101 and 102 are equal. Under these circumstances, the current flow through the tubes in the output section are equal and there is zero potential difference across resistors 121 and 122.

If it is now assumed, for example, that the potential at terminal 102 remains constant and the potential at terminal 101 varies, a similar variation occurs at the cathodes of tubes 106 and 107. A corresponding change in the voltage at the anode of tube 107 is coupled to the control grid of tube 114 so a change in the current flow through that tube relative to the current through tube 115 occurs. The change in current flow through tube 114 results in a change at its cathode because a different voltage is now developed across resistance 123. The variations in voltage across resistance 123 are coupled back to the control grid of tube 107 with a tendency to compensate for the changes at the cathode of the tubes in differential amplifier 105.

At the same time, the control grid of tube 126 in the differential amplifier of section 104, responsive to the voltage at terminal 102, is subjected to the variations in voltage at the cathode of the output tubes 114 and 115. This results in an opposite polarity variation in voltage at the control grid of tube 115. Hence, tubes 114 and 115 are driven in an opposite manner by a change in voltage at tube 101 and a very definite voltage difference appears across resistors 121 and 122. The circuit remains stabilized, however, because the cathodes of tubes 114 and 115 are returned substantially to their quiescent voltage. This is due to the opposite effect thereon by the positive and negative going signals applied to the grids of the tubes in the output section by the anodes of tubes 107 and 126.

As in the circuit of FIGURE 5, the voltage at the cathode of tube 114 is bootstrapped back to the anode and cathode of the input tubes of sections 102 and 104 so that the latter tubes draw virtually zero grid current. Because the anode and cathodes of the input stages 103 and 104 are both floating, there are few limitations on the reference potential point of the voltages coupled to terminals 101 and 102.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. An amplifier system for electrical signals comprising a differential amplifier and an output stage, said differential amplifier having first and second amplifying devices, said output stage having a third amplifying device, each of said amplifying devices having a first electrode for emitting electrically charged carriers, a second electrode for collecting said charged carriers and a control electrode for controlling flow of charged carriers between said first and second electrodes, means for applying an input signal to said control electrode of said first amplifying means interconnecting said first electrodes of said first and second amplifying devices to vary said first electrodes in the same sense in response to an input signal, a signal output connection, means for applying the signal on said signal output connection to said control electrode of said second amplifying device, a first source of voltage, means connecting said second electrode of said first amplifying device to said signal output connection through said first source of voltage, a second source of voltage, a first impedance, means connecting said second electrode of said second amplifying device to said control electrode of said second amplifying device through at least said second source of voltage and said first impedance connected in series, means for coupling at least a part of the signal voltage developed across said first impedance to said control electrode of said third amplifying device, and further means connecting said first electrode of said third amplifying device to said signal output connection so as to develop an output signal thereon.

2. The combination according to claim 1 wherein said means interconnecting said first electrodes comprises a second impedance, said first electrodes being connected to a reference potential through said second impedance.

3. The combination according to claim 2 wherein said further means comprises a third impedance, said first electrode of said third amplifying element being connected through said third impedance to the reference potential.

4. The combination according to claim 1 wherein said first impedance is connected between said first electrode and said control electrode of said third amplifying element.

5. The combination according to claim 1 wherein said amplifying devices are electron tubes each having a screen grid, each of said screen grids being connected to said second electrode of said first amplifying device.

6. The combination according to claim 1 wherein said second amplifying device is connected through said second source of voltage and said first impedance to said second electrode of said first amplifying device.

7. The combination according to claim 1 wherein said reference potential is such that said output connection is at zero potential with an input signal of zero potential.

8. The combination according to claim 1 wherein said means interconnecting said first electrodes comprises at least a third source of voltage and a second impedance connected in series between said first electrode of said first and second amplifying devices and said control electrode of said second amplifying device.

9. The combination according to claim 8 wherein said second amplifying device is connected through said second source of voltage and said first impedance to said second electrode of said first amplifying device.

10. The combination according to claim 1 wherein said second source of voltage has a positive and negative voltage terminal, said positive terminal being coupled to said control electrode of said second amplifying device and said first impedance being connected between said second electrode of said second amplifying device and said negative terminal, and a further impedance connected between said second electrode and said second amplifying device and said first source of voltage.

11. The combination according to claim 10 wherein said means interconnecting said first electrodes comprises a second impedance, said first electrodes of said first and second amplifying devices being connected through said second impedance to said negative terminal.

12. The combination according to claim 1 wherein said output stage comprises a push-pull cathode follower amplifier.

13. An amplifier system comprising first and second amplifier systems as described in claim 1, said first and second systems having said control electrodes of said second amplifying devices connected together and having said output connections connected together and having said first electrodes of said first and second amplifying devices connected together, a pair of impedances, each impedance being connected in series with said second electrode of said third amplifying element of a different one of said first and second amplifier systems, and means for deriving an output signal between said last-mentioned electrodes.

14. The combination according to claim 1 wherein said further means comprises a third impedance, said first electrode of said third amplifying element being connected through said third impedance to the reference potential.

References Cited by the Examiner

UNITED STATES PATENTS

| | | | |
|---|---|---|---|
| 2,233,317 | 2/1961 | Konkle | 330—84 X |
| 3,047,814 | 7/1962 | Walton | 330—70 |

| | | | |
|---|---|---|---|
| 3,124,762 | 3/1964 | Reeves | 330—69 X |
| 3,209,277 | 9/1965 | Burwen | 330—69 |
| 3,214,703 | 10/1965 | Offner | 330—79 X |
| 3,218,468 | 11/1965 | Dupire et al. | 307—88.5 |

FOREIGN PATENTS

| | | |
|---|---|---|
| 365,126 | 12/1962 | Switzerland. |

ROY LAKE, *Primary Examiner.*

N. KAUFMAN, *Assistant Examiner.*